US006278904B1

(12) United States Patent
Ishii

(10) Patent No.: US 6,278,904 B1
(45) Date of Patent: Aug. 21, 2001

(54) FLOATING ROBOT

(75) Inventor: Toshinao Ishii, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/733,099

(22) Filed: Dec. 11, 2000

(30) Foreign Application Priority Data

Jun. 20, 2000 (JP) ........................................ 12-184791

(51) Int. Cl.[7] ........................................ G06F 19/00

(52) U.S. Cl. .................... 700/245; 700/302; 114/61.14; 114/278; 114/320; 342/13; 224/120; 224/137.4; 89/37.06; 89/38; 89/41.22

(58) Field of Search .................... 700/245; 224/137.4, 224/120; 114/61.14, 278, 275, 280, 320; 104/138.1, 130.05, 27, 28; 89/38, 41.22, 37.06; 367/133, 135, 45, 4; 441/2, 28; 342/13, 14, 147, 153; 704/203, 204

(56) References Cited

U.S. PATENT DOCUMENTS

| | | | | |
|---|---|---|---|---|
| 3,623,444 | * | 11/1971 | Lang | 69/43 |
| 3,730,123 | * | 5/1973 | Lang | 114/278 |
| 3,897,744 | * | 8/1975 | Lang | 114/61.14 |
| 5,677,506 | * | 10/1997 | Wallin | 89/38 |
| 5,889,925 | * | 3/1999 | Tsurutani et al. | 700/254 |
| 5,950,543 | * | 9/1999 | Oster | 104/138.1 |
| 6,176,451 | * | 1/2001 | Drymon | 244/3.14 |

FOREIGN PATENT DOCUMENTS

| | | | |
|---|---|---|---|
| 01226940-A | * | 9/1989 | (JP) . |
| 05119837-A | * | 5/1993 | (JP) . |
| 8-314401 | | 11/1996 | (JP) . |

OTHER PUBLICATIONS

Agrawal et al., A New Laboratory Simulator for Study of Motion of Free–Floating Robots Relative to Space Targets, 1996, IEEE, pp. 627–633.*

* cited by examiner

*Primary Examiner*—William A. Cuchlinski, Jr.
*Assistant Examiner*—McDieunel Marc
(74) *Attorney, Agent, or Firm*—Leydig, Voit & Mayer, Ltd.

(57) ABSTRACT

A floating device is provided, which allows an entire robot main body to float at a site. Mounted on the floating device are an image sensor which captures image data of persons around the robot main body; an information processing device which recognizes a specified person based on the image data captured by the image sensor, calculates a position of the specified person, and outputs a control signal for moving the robot main body toward the position of the specified person; a propulsion device which moves, based on the control signal, the entire robot main body to a close position close to the specified person so that the robot main body can be seen by the specified person; and an image display device, which displays image information useful for the specified person using the site when the robot main body reaches the close position. The information can be supplied to a specified object in a bi-directional fashion.

5 Claims, 2 Drawing Sheets

FLOATING ROBOT

BACKGROUND OF THE INVENTION

1. Field of the Invention

The present invention relates to a floating type robot that supplies and collects information subjectively (in an autonomous fashion).

2. Description of the Related Art

A related floating type robot will be described with reference to the drawing. FIG. 3 shows a structure of a floating robot disclosed, for instance, in Japanese Patent Application Laid-open No. 8-314401.

In FIG. 3, reference numeral 30 designates a floating robot in the form of an airship, and reference numeral 31 designates an airship balloon. This airship balloon 31 is provided at its side faces with transparent screens 32, and at its lower part with a transparent window 33. Two mirrors 34 are also installed inside the airship balloon 31 by wires 35.

In the drawing, a base 36 is in the form of a gondola, which is mounted to the airship balloon 31 by the wires 35. In this gondola-shaped base 36, two projectors 37 and speakers 38 are installed.

Next, the operation of the conventional floating type robot will be described with reference to the drawing. Projected light emitted from projectors 37 passes through the transparent window 33, and is reflected by the mirrors 34 to the right and left to form images on the transparent screens 32.

This airship balloon 31 as a whole is suspended by the wires 35 from an actual airship or a ceiling of an exhibition hall. A power supply cable and signal lines are incorporated into these wires 35 for use by the projectors 37 and the speakers 38.

Heat generated from the projectors 37, etc. is discharged outside from the base 36 by natural convection or forced ventilation. The speakers 38 are activated on demand to output audio synchronous with the above-mentioned images.

This airship balloon 31 is useful for the user since the airship balloon 31 can be set in the exhibition hall to display the state of the exhibition and the commercial messages using large display screens 32. In particular, floating the airship balloon 31 in 9 exhibition hall, 9 football stadium, or baseball stadium will further excite the event.

However, the related floating type robot as mentioned above can hardly recognize ambient information, and therefore can not select an object to which the information is to be supplied, and receive an input of the information from the object. Consequently, there arises a problem in that the robot merely supplies the information to many and unspecified objects in a one-way manner.

For the same reason, there arises a problem in that the robot can not be used as a monitoring device.

Further, even though a bidirectional information supply may be possible, the absence of moving means in the robot requires another means for moving the user to the robot, and thus there is the problem that the efficiency of use can not be increased. Since the information capable of being captured is limited, there is the problem that the robot is not suitable for use as the monitoring device.

SUMMARY OF THE INVENTION

This invention was made in order to solve the aforementioned problems.

An object of the present invention is to provide a floating type robot which can capture ambient information and supply individual information to each object by judgement based on the captured information.

Another object of the present invention is to provide a floating type robot which can move by itself to capture different kinds of ambient information and to effectively supply information.

Still another object of the present invention is to provide a floating type robot which can be used also as a monitoring device.

A floating type robot according to a first aspect of the present invention includes: a floating device which allows an entire robot main body to float in a predetermined space of a site; an image sensor which captures image data of persons around the robot main body; an information processing device which recognizes a specified person based on the image data captured by the image sensor, calculates a position of the specified person, and outputs a control signal for moving the robot main body to the position of the specified person; a propulsion device which moves, based on the control signal, the entire robot main body to a certain position which is so close to the specified person that the robot main body can be well seen by the specified person; and an image display device which displays image information useful for the specified person to use the site when the robot main body reaches the certain position.

A floating type robot according to a second aspect of the present invention further includes an audio sensor, which captures acoustic data around the robot main body.

A floating type robot according to a third aspect of the present invention further includes a touch sensor which inputs an inquiry from the specified person.

A floating type robot according to a fourth aspect of the present invention further includes an audio generating device which outputs audio information useful for the specified person to use the site.

A floating type robot according to a fifth aspect of the present invention further includes a communication device which conducts a communication to and from an external device.

DETAILED DESCRIPTION OF THE PREFERRED EMBODIMENTS

First Embodiment

Figure 1:
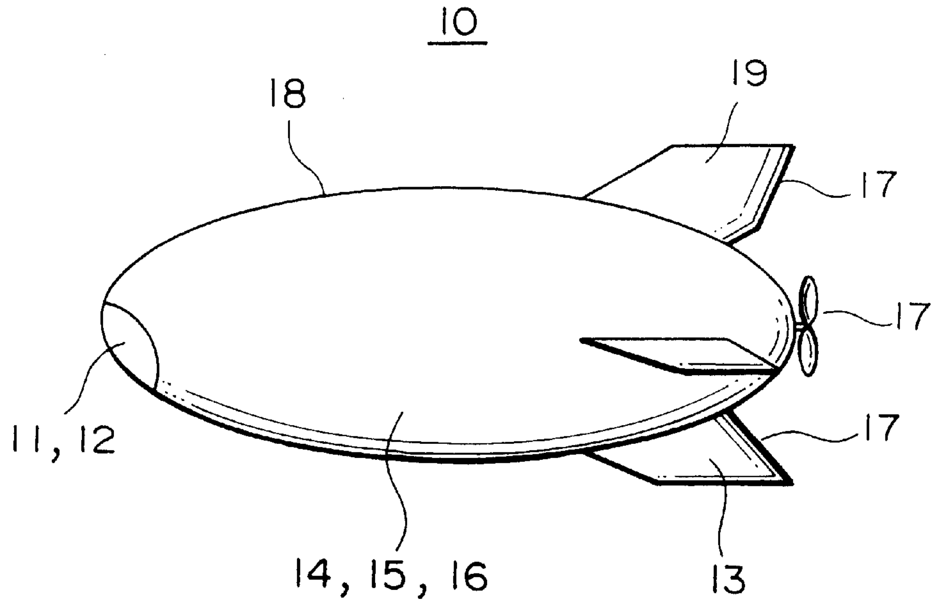
FIG. 1 shows a structure of a floating robot according to a first embodiment of the present invention.

A floating type robot according to a first embodiment of the present invention will be described with reference to the drawing. FIG. 1 shows a structure of the floating type robot according to the first embodiment of the present invention. In the drawing, the same reference numeral designates the same or equivalent part.

In FIG. 1, reference numeral 11 designates an image sensor constructed, for instance, of a visible, infrared or ultraviolet sensor or a combination of these sensors, selected depending on an object to be distinguished. Reference numeral 12 designates an audio sensor, such as an audio band sensor and an ultrasonic wave band sensor. FIG. 1 shows a case where these are mounted at the same location, but it is not the sole case, and further a plurality of sensors in the form of an image sensor array and/or an audio sensor array may be provided to efficiently capture the target information. Reference numeral 13 further designates a touch sensor, which may be constructed by a small number of buttons, such as those used in a game machine, or by a touch panel.

In FIG. 1, reference numeral 14 designates an information processing device, such a microcomputer, that has a GPS function and that executes information processing and control. Reference numeral 15 designates an image display device, such as a display, which is attached, for instance, such that the device is stuck on a surface of a floating device described later or suspended from the floating device. Reference numeral 16 designates an audio generating device, which generates an audio in the audio band, and if necessary in the ultrasonic wave band.

In FIG. 1, reference numeral 17 designates a propulsion device, which is constructed, for instance, by an unillustrated drive device, such as a motor using a battery or the like as a drive power source, a propeller connected to the drive device for propulsion, and wings for determining the moving direction. Reference numeral 18 designates a floating device, which obtains the buoyancy, for instance, by containing therein the gas (such as helium gas) lighter than the air. Reference numeral 19 designates a communication device for transmission of information to and from an external host computer or other robots. The floating type robot 10 is about 1m in its entire size, and all components used are super-light.

Next, the operation of the floating type robot according to the first embodiment will be described with reference to the drawing.

The floating type robot 10 shown in FIG. 1 is allowed to fly in a site such as a public space of an airport, a station, a hall or the like where many and unspecified persons come and go. The image sensor 11 picks up an image of persons around the robot 10, and the information processing device 14 uses data thereof to search a person, who stays at the same location for a certain time period, by a known image processing.

If a person matching the above-noted condition is discovered, the information processing device 14 recognizes its own position using the GPS function, calculates a distance and a direction, etc. to the person thus discovered, controls the drive device by control signals, and moves the robot 10 by the propulsion device 17 to a location which is so close to the person that the robot 10 can be well recognized by the person. At that location, the commercial image information or the information useful for persons who use the site is displayed on the image display device 15.

The information to be displayed in this case may be previously stored in a memory or the like in the robot 10, or otherwise may be transferred through the communication device 19 from an external device.

Prior to the information display, characteristics of a person searched as the object, such as characteristics of male or female, adult or child, age, etc., or states of the person, such as whether or not the person is watching the robot 10, are inferred using the captured image of the person, and the kind of information to be displayed is varied to match with the inference results by known image processing.

Further, there is a case that the information is supplied not only through the image but also through the audio from the audio generating device 16, and this is also selected depending on the characteristics of the person. The operation mentioned above makes it possible to transmit or supply the information in more impressive manner.

The condition is set for the robot 10 to search a person who gives a sign, for instance, by raising a hand toward the robot 10, and if the robot 10 finds the person who gives a sign, the robot 10 is moved toward the side of the person to await inquiry input through the touch sensor 13 or the audio sensor 12 by the person while visually displaying a guide of the available public service.

For example, if the public space is an airport, the robot displays an operation guide for selecting required processes, such as check-in and purchase of the ticket to use the airport, while displaying the arrival/departure status guide. In this state, the relationship between the robot 10 and the user, i.e. the person in front of the robot 10 becomes the relationship between a usual check-in terminal or another operation terminal and the user, and the robot 10 handles a series of the user's input operations through the touch sensor 13 and the audio sensor 12 provided to the robot 10 to transfer the input information to the host computer using the communication device 19. By this operation of the robot, the user need not move towards the operation terminal each time.

It is also possible to monitor a state of the site while moving along an appropriate route without searching for a specified person. The purpose of the monitoring is to allow an administrator to maintain the security and recognize the states that are necessary for maintaining the security and that are periodically varied, such as a state of crowdedness and the presence or absence of a dangerous object in order to improve the utility. Another purpose thereof is to collect and store data on the states of utilization by, for instance, tracing moving routes of respective users and recognizing a periodic crowded state pattern. The latter purpose is directed to individual data accumulation useful in statistically recognizing the state of space utilization, which provides useful information in designing or layout-changing a shop, a facility, or the like.

To conduct these information supply, information terminal and monitoring over a wide area, use of a plurality of the floating type robots 10 is required. In this case, the distribution or arrangement of the floating type robots 10 is important. The various sensors 11, 12, the information processing device 14 and the communication device 19 provided in the first embodiment are used to determine the arrangement of other floating type robots.

The robot 10 can detect an obstructive object therearound and other floating type robots 10 based on the information obtained by the image sensor 11. Alternatively, the robot 10 can generate an ultrasonic wave from the audio generating device 16 and input through the audio sensor 12 the echo of the sound generated by itself and the sound generated by other floating type robots 10 to thereby detect an obstructive object and the other floating type robots 10 based on the signal thus input or the like. The entire strategy as to how the separate floating type robots 10 are arranged is stored in the information processing device 14, and based on the arrangement information thus detected by the sensors, a moving route of each of the robots 10 is calculated.

In the first embodiment, the floating type robot 10 moving along an appropriate route, compares a target color, shape, motion or acoustic characteristic information, which is stored previously or transferred through the communication device 19, with information captured through the image sensor 11 and the audio sensor 12, using the information processing device 14, and searches a target object by a known image recognition processing. If the target object is found, then the floating type robot 10 moves toward the target object to accomplish the operation purpose.

In the first embodiment, the information is supplied to the target object while the information is captured from the target object. There is also a case that the operation control information is obtained by the information transmission that is conducted through the communications device 19 to and from an external information processing device, other than the information processing device 14 provided in the floating type robot 10.

In the first embodiment, the information captured through the image sensor 11 and the audio sensor 12 is used for the purpose of detecting a current position of the robot 10 in order for the robot 10 to move around all objects to be monitored or to monitor a specified object. The information captured through the image sensor 11 and the audio sensor 12 is also stored in the robot 10, or transferred externally through the communications device 19 and stored in an external device, as the monitoring data.

In the first embodiment, the floating type robots are communicated with one another, so that the information obtained by respective robots are used commonly as the common information, on the basis of which their movements are scheduled and executed to cooperatively conduct the information supply or the monitoring entirely.

The floating type robot according to the first embodiment includes the display device integrated with the robot, the moving means by such as the propulsion device 17 and the floating device 18, the image sensor 11 and audio sensor 12 provided for inputting the information such an ambient light, an ambient audio, and a user's instruction, the information processing device 14 for inferring an ambient status based on the inputted data, the communication device 19 for information exchange to and from the host computer, and further the image display device 15 by the image and the audio. Accordingly, by changing a method and a strategy for accomplishing the function and the purpose of the robot appropriately in conformity with the ambient status, the display device high in commercial effect and information transmission effect can be realized. Further, it is possible to concurrently realize the information terminal which requires less labor for the user to move to the site where the device is located, and the collection of the monitoring information for managing a wide space used by many and unspecified persons.

Second Embodiment

Figure 2:
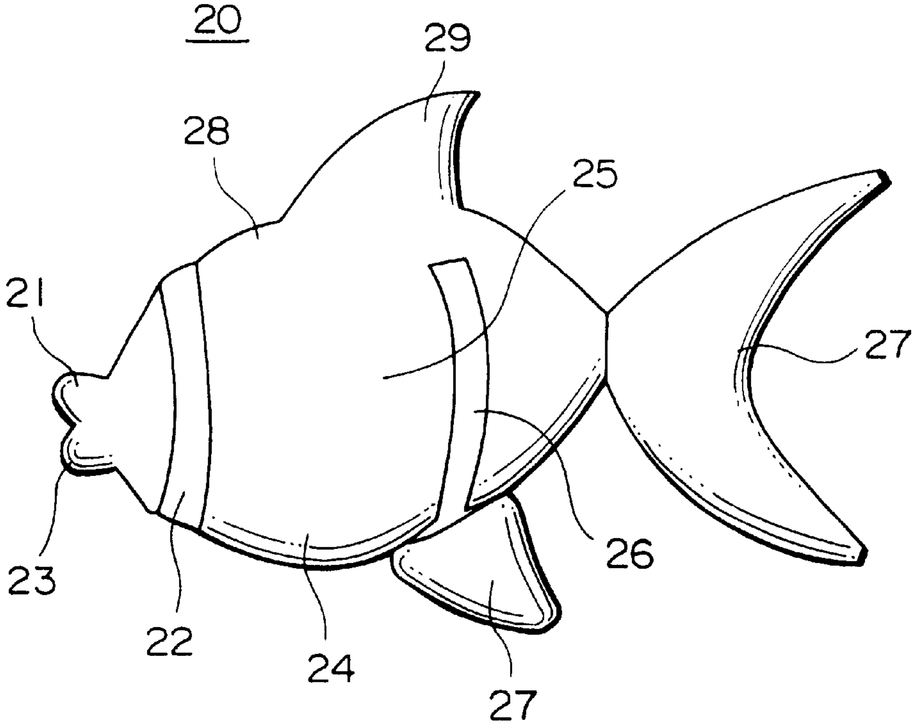
FIG. 2 shows a structure of a floating robot according to a second embodiment of the present invention.
Figure 3:
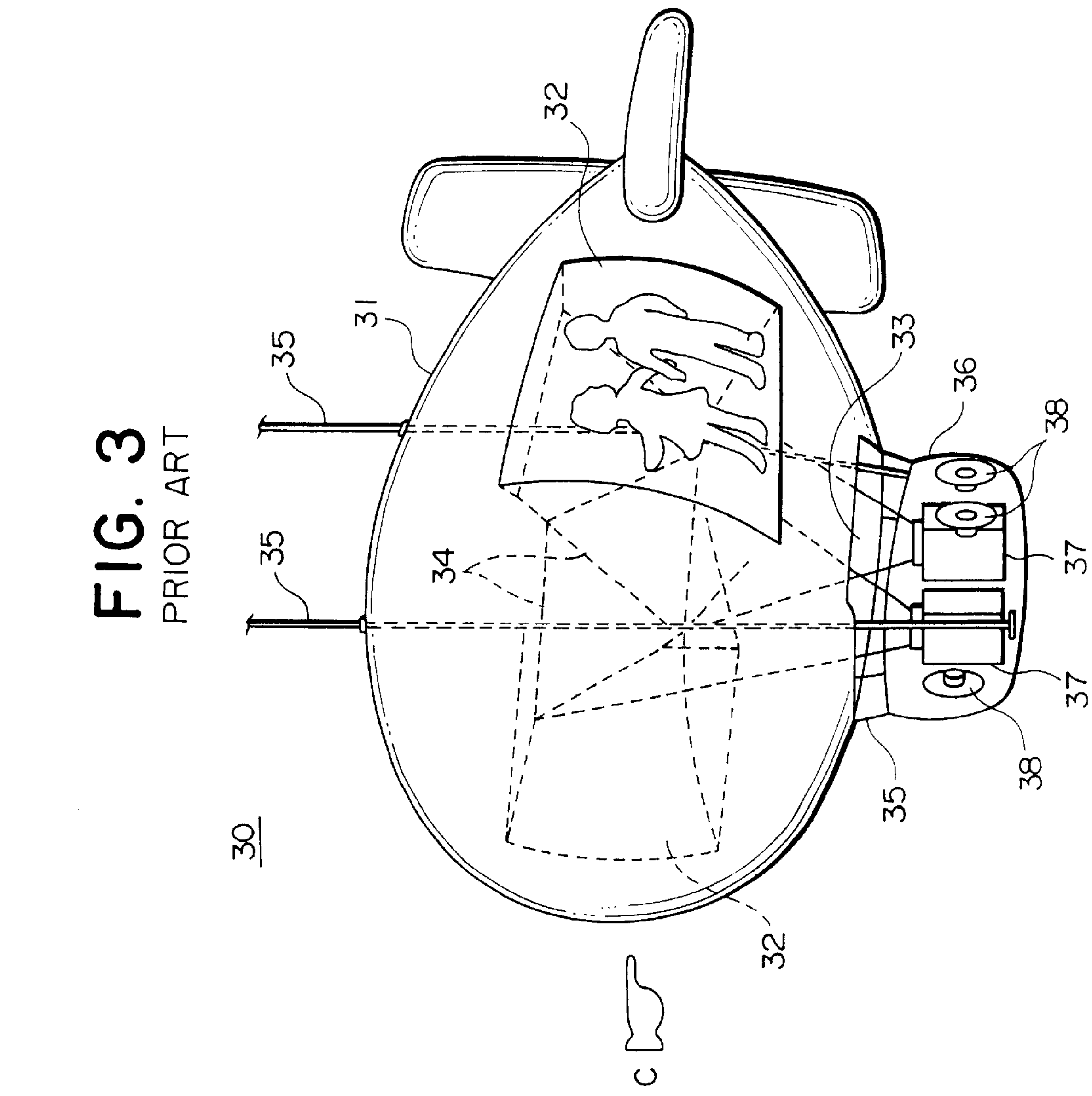
FIG. 3 PRIOR ART
FIG. 3 shows a structure of a related floating robot.

A floating type robot according to a second embodiment of the present invention will be described with reference to the drawing. FIG. 2 shows a structure of the floating type robot according to the second embodiment of the present invention.

In FIG. 2, reference numeral 21 designates an image sensor, reference numeral 22 designates an audio sensor, reference numeral 23 designates a constantly maintaining device that is a device for supplementing power and float gas. Reference numeral 24 designates an information processing device, reference numeral 25 designates an image display device, reference numeral 26 designates an audio generating device, and reference numeral 27 designates a propulsion device that is a less-noisy device.

In the drawing, reference numeral 28 designates a floating device, and reference numeral 29 designates a communication device. The entire shape of the floating type robot 20 is designed as a friendly shape. The components corresponding to the components of the first embodiment have the similar functions and so on.

Next, the operation of the floating type robot according to the second embodiment will be described with reference to the drawing.

In a case where no one is present, or during midnight, the floating type robot 20 serves as a security device such that the robot 20 moves around the indoor space to monitor the presence or absence of abnormality such as a fire and a burglary based on the information obtained through the image sensor 21 and the audio sensor 22, and if an abnormal event occurs, then the robot 20 uses the communications device 29 to conduct notification of the state through a telephone communication line or the like to the administrator or the administration center.

In a case where a fact that the user has gone home is detected, for example, through the image recognition, the robot 20 may move to the entrance to meet the user. Even in a case where a person is present in the indoor space, if the person is an infant or an aged, the robot 20 monitors the person using the image sensor 21 and the audio sensor 22, and if the abnormal event, such as a shout, a cry or the like is detected, then the robot 10 gives notification to a previously set notification receptor, such as a parent and a helper. When the abnormal event is to be detected, the robot 20 does not solely depend on the passive information obtained only through the image sensor 21 and the audio sensor 22, but actively gives a speech or an inquiry to the target person using the audio generating device 26 or the image display device 25 to surely infer the presence or absence of the abnormal event by detecting a response thereto.

In a case where the floating type robot 20 is used in the indoor space, the floating type robot 20 may serve to also achieve amusement purposes. That is, if a person is present in the indoor space, the robot 20 infers the user's instruction, intention, state or the like using the image sensor 21 and the audio sensor 22, or receives the instruction inputted through another computer or an operation terminal using the communications device 29, thereby starting an amusement operation mode in which the robot 20 flies around the user, gives a speech to the user, or displays an appropriate image to satisfy the user's interest.

At this time, the robot 20 detects the user's response through the image sensor 21 and the audio sensor 22 to infer the user's evaluation to each operation in the amusement operation mode. Based on this information, the robot 20 conducts the learning using the information processing device 24 to improve the control process of the amusement operation. The improved control method is stored in the nonvolatile memory in the information processing device 24 to continuously maintain and develop the effect of the learning.

The second embodiment can be purposely applied as a modification to the utilization in a home for aged or a hospital. In this case, the same device structure as that for family use can be used. The design is varied depending on the purpose. In the home for aged or the hospital, it is necessary for the administrator to recognize the states of residents or patients, but installing a camera or the like will cause a privacy problem. The regular patrol by a nurse or an employee has a problem that there will be considerable increase in the human cost and labor. By allowing the floating type robot 20 according to the second embodiment to conduct such patrol, the human cost and labor can be reduced. Since the floating type robot 20 conducts the patrol at a certain periodical interval, the patient and the aged person can distinguish whether or not they are watched. Further, even if the robot 20 comes to watch one of them, the person can instruct the robot 20 to go to another subsequent person without doing anything. Accordingly, the privacy problem is less likely to occur. The various sensors and the information display, and the information processing device equipped in the floating type robot 20 can realize these functions by conducting the information transmission to and from the user similarly to the example of the family use.

In the indoor use, particularly the family use, the robot according to the second embodiment of the present invention may be modified to have, as,the moving means, wheels, legs or rails for moving on the floor surface, a wall surface or a ceiling in place of the floating device 28 and the propulsion device 27. Further, to achieve the same purpose with the robot placed on the water surface or in the water, the robot may be provided with means for moving on the water surface, in the water, on the surface of other liquid or in the other liquid.

Since the floating type robot according to the second embodiment has the information processing device 24, the image display device 25, the audio generating device 26, the propulsion device 27, the floating device 28 and the. communication device 29, the floating type robot can realize the monitoring of the user's state through the image sensor 21 and the audio sensor 22 in the site such as the family, the hospital, and the home for the aged where it is used by the specified persons, while taking into account the user's privacy and preference.

What is claimed is:

1. A floating robot comprising:

a floating device including an entire robot main body that floats at a site;

an image sensor which captures image data of persons around the robot main body;

an information processing device which recognizes a specified person based on the image data captured by the image sensor, calculates a position of the specified person, and outputs a control signal for moving the robot main body toward the position of the specified person;

a propulsion device which moves, based on the control signal, the entire robot main body to a close position so close to the specified person that the robot main body can be seen by the specified person; and an image display device which displays image information useful for the specified person using the site when the robot main body reaches the close position.

2. The floating robot according to claim 1, further comprising an audio sensor which captures acoustic data around the robot main body.

3. The floating robot according to claim 1, further comprising a touch sensor which inputs an inquiry from the specified person.

4. The floating robot according to claim 1, further comprising an audio generating device which outputs audio information useful for the specified person using the site.

5. The floating robot according to claim 1, further comprising a communication device which communicates with an external device.

* * * * *